US012687829B2

(12) United States Patent
Horii et al.

(10) Patent No.: US 12,687,829 B2
(45) Date of Patent: Jul. 21, 2026

(54) CONTROL SYSTEM, COMPUTER-READABLE RECORDING MEDIUM, AND CONTROL METHOD

(71) Applicant: Panasonic Intellectual Property Corporation of America, Torrance, CA (US)

(72) Inventors: Noriaki Horii, Kyoto (JP); Tatsumi Nagashima, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 399 days.

(21) Appl. No.: 18/229,334

(22) Filed: Aug. 2, 2023

(65) Prior Publication Data

US 2023/0375992 A1     Nov. 23, 2023

Related U.S. Application Data

(63) Continuation of application No. PCT/JP2022/003305, filed on Jan. 28, 2022.

(30) Foreign Application Priority Data

Feb. 10, 2021    (JP) ................................. 2021-019440
Feb. 10, 2021    (JP) ................................. 2021-019441

(51) Int. Cl.
    *G16Y 40/35*     (2020.01)
    *G05B 15/02*     (2006.01)
    *G16Y 20/00*     (2020.01)
(52) U.S. Cl.
    CPC .............. *G05B 15/02* (2013.01); *G16Y 20/00* (2020.01); *G16Y 40/35* (2020.01)

(58) Field of Classification Search
    CPC ......... G05B 15/02; G16Y 20/00; G16Y 40/35
    See application file for complete search history.

(56) References Cited

U.S. PATENT DOCUMENTS

2006/0053219 A1*  3/2006  Kutsumi ................ G06Q 30/02
                                      709/224
2015/0033136 A1   1/2015  Sasaki et al.
                (Continued)

FOREIGN PATENT DOCUMENTS

WO       2014/128801      8/2014

OTHER PUBLICATIONS

International Search Report (ISR) from International Searching Authority (Japan Patent Office) in International Pat. Appl. No. PCT/JP2022/003305, dated Mar. 15, 2022, together with an English language translation.

*Primary Examiner* — Michael W Choi
(74) *Attorney, Agent, or Firm* — Greenblum & Bernstein, P.L.C.

(57) ABSTRACT

An acquiring part acquires disposition information and record information indicative of performance record of each of a plurality of devices. The disposition information includes a relevance between identification information of each of a plurality of rooms and identification information of each of the devices disposed in each room. A space creating part creates a new space by combining two or more of the rooms on the basis of the disposition information and the record information acquired by the acquiring part. A device control part generates relevance information indicative of a relevance between identification information of the new space and identification information of two or more devices included in the new space among the devices. A display part notifies, on the basis of the relevance information, at least one of collective control information for collectively con- (Continued)

```
                                    ┌─S100
┌─────────────────────────────────────┐
│   ACQUIRE DISPOSITION INFORMATION    │
└─────────────────────────────────────┘
                   │
                   ▼                ┌─S200
┌─────────────────────────────────────┐
│     ACQUIRE RECORD INFORMATION       │
└─────────────────────────────────────┘
                   │
                   ▼                ┌─S300
┌─────────────────────────────────────┐
│          CREATE NEW SPACE            │
└─────────────────────────────────────┘
                   │
                   ▼                ┌─S400
┌─────────────────────────────────────┐
│   ASSOCIATE NEW SPACE WITH DEVICES   │
└─────────────────────────────────────┘
                   │
                   ▼                ┌─S500
┌─────────────────────────────────────┐
│     OUTPUT RELEVANCE INFORMATION     │
└─────────────────────────────────────┘
``` trolling the two or more devices and individual control information for individually controlling the two or more devices.

13 Claims, 16 Drawing Sheets

(56) References Cited

U.S. PATENT DOCUMENTS

| | | | | |
|---|---|---|---|---|
| 2016/0320760 | A1* | 11/2016 | Brun | G05B 19/042 |
| 2018/0329617 | A1* | 11/2018 | Jones | G01C 21/206 |
| 2023/0326458 | A1* | 10/2023 | Lambourne | G10L 15/22 |
| | | | | 704/275 |

* cited by examiner

| ROOM ID | ROOM NAME | DEVICE ID | DEVICE NAME |
|---------|-----------|-----------|-------------|
| R1 | LIVING ROOM | A01 | AIR CONDITIONER |
| R1 | LIVING ROOM | A02 | MAIN LAMP |
| R1 | LIVING ROOM | A03 | INDIRECT LAMP |
| R1 | LIVING ROOM | A04 | TV |
| R2 | DINING ROOM | A05 | MAIN LAMP |
| R2 | DINING ROOM | A06 | INDIRECT LAMP |
| R2 | DINING ROOM | A07 | AIR CONDITIONER |
| R3 | KITCHEN | A08 | LAMP |
| R3 | KITCHEN | A09 | VENTILATOR |

CONTROL SYSTEM, COMPUTER-READABLE RECORDING MEDIUM, AND CONTROL METHOD

TECHNICAL FIELD

The present disclosure relates to a control system, a computer-readable recording medium, and a control method.

BACKGROUND ART

Patent Literature 1 discloses a home controller for controlling switch-on and switch-off of a plurality of devices disposed in a plurality of rooms of a house.

The home controller disclosed in Patent Literature 1 manages the devices by a room unit of the house.

However, there is a case that a plurality of rooms is used as a single activity space depending on a lifestyle of a resident in the house. In this case, it is more practical for the resident to manage the devices disposed in the house by an activity space unit than by a room unit.

CITATION LIST

Patent Literature

Patent Literature 1: International Unexamined Patent Publication WO 2014/128801

SUMMARY OF INVENTION

An object of the present disclosure is to provide a control system, a computer-readable recording medium, and a control method that enable an execution of an optimum device control according to an activity style of a user in a building.

Means for Solving the Problems

A control system for controlling a plurality of devices disposed in a building having a plurality of rooms according to an aspect of the present disclosure includes: an acquiring part for acquiring disposition information and record information indicative of performance record of each of the devices, the disposition information including a relevance between identification information of each of the rooms and identification information of each of the devices disposed in each room; a space creating part for creating a new space by combining two or more of the rooms on the basis of the disposition information and the record information acquired by the acquiring part; a device control part for generating relevance information indicative of a relevance between identification information of the new space and identification information of two or more devices included in the new space among the devices; and a notification part for notifying, on the basis of the relevance information, at least one of collective control information for collectively controlling the two or more devices and individual control information for individually controlling the two or more devices.

BRIEF DESCRIPTION OF DRAWINGS

FIG. 7 is an illustration briefly showing an example of disposition information.

DESCRIPTION OF EMBODIMENTS

Underlying Findings for Present Disclosure

Figure 1:
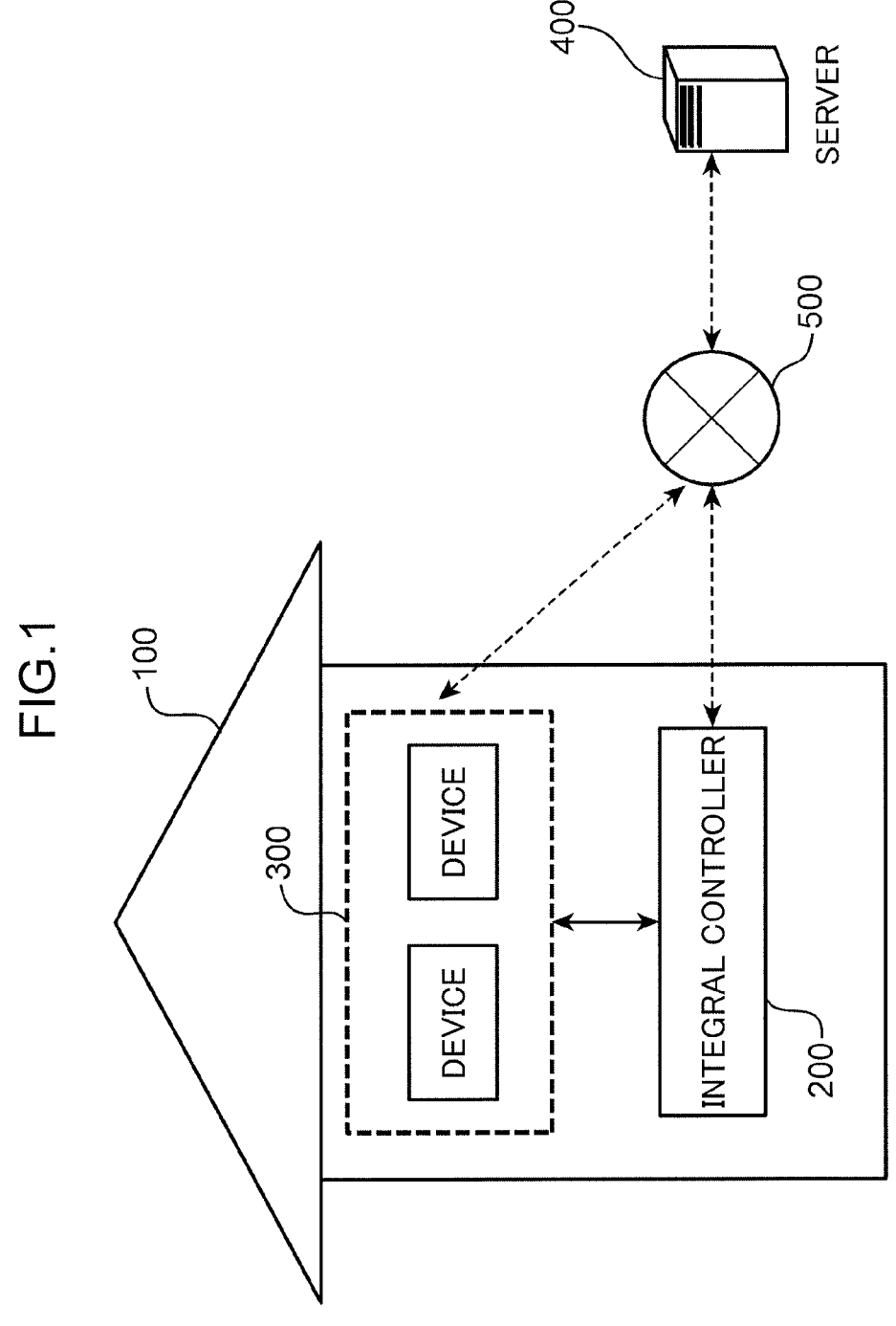
FIG. 1 is a diagram showing a whole structure of a home control system according to an embodiment of the present disclosure.

In a smart home with IoT technology, a control system (home controller) for integrally controlling a plurality of devices disposed in a plurality of rooms of a house may be used. For example, Patent Literature 1 discloses a home controller for controlling switch-on and switch-off of a plurality of devices disposed in a plurality of rooms of a house. The home controller manages the devices by a room unit of the house.

However, there is a case that a plurality of rooms, e.g., a living room and a dining room, is used as a single activity space depending on a lifestyle of a resident in a house. In this case, it is more practical for the resident to manage the devices disposed in the house by an activity space unit than by a room unit.

In this regard, since the lifestyle of a resident varies by household, it is difficult for an operator of a management company to optimally set management units for a plurality of devices in accordance with a lifestyle of each household when the home controller is installed. There may be a case that the resident manually sets the management units according to their lifestyle, but the setting is complicated; thus, means enabling an automatic setting has been expected to be achieved.

To solve the above-mentioned problem, the present inventors found that an analysis of performance record of a plurality of devices disposed in a house having a plurality of rooms enables identifying a lifestyle of a resident of a house and optimally setting management units for the devices according to the lifestyle, thus achieving the present disclosure.

Next, embodiments of the present disclosure will be described.

A control system for controlling a plurality of devices disposed in a building having a plurality of rooms according to an aspect of the present disclosure includes: an acquiring part for acquiring disposition information and record information indicative of performance record of each of the devices, the disposition information including a relevance between identification information of each of the rooms and identification information of each of the devices disposed in each room; a space creating part for creating a new space by combining two or more of the rooms on the basis of the disposition information and the record information acquired by the acquiring part; a device control part for generating relevance information indicative of a relevance between identification information of the new space and identification information of two or more devices included in the new space among the devices; and a notification part for notifying, on the basis of the relevance information, collective control information for collectively controlling the two or more devices.

In this configuration, a new space is created by combining two or more of the rooms on the basis of the disposition information and the record information. Further, relevance information indicative of a relevance between identification information of the new space and identification information of two or more devices included in the new space is generated; and, on the basis of the relevance information, collective control information for collectively controlling the two or more devices is notified. An analysis of the record information indicative of the performance record of each device enables an accurate identification of an activity style of a user of the building, resulting in an execution of an appropriate device control for the activity style.

In the configuration above, the space creating part calculates the number of active devices that is the number of devices which are active in each room in the same unit time of a plurality of divisional unit times of a day, and creates the new space by combining two or more rooms each of which has active devices not less than a threshold in number among the rooms.

In this configuration, a combination of the two or more rooms each of which has active devices not less than a threshold in number in the same unit time enables an appropriate creation of a new space for an activity style of a user.

In the configuration above, the space creating part calculates the number of active devices using a preset weighting factor for a device type.

In this configuration, setting a larger weighting factor for a device (e.g., a lamp) with a higher possibility that the user is in a room where the device is active and a calculation with the weighting factor by the space creating part of the number of active devices enable a more appropriate creation of a new space for an activity style of a user.

In the configuration above, the space creating part changes the threshold in accordance with each unit time.

In this configuration, a change of the threshold in accordance with each unit time enables a more appropriate creation of a new space for an activity style of a user.

In the configuration above, the space creating part creates the new space by combining two or more rooms which have two or more devices which have been active within a predetermined time among the devices.

In this configuration, a combination of two or more rooms which have two or more devices which have been active within a predetermined time enables a more appropriate creation of a new space for an activity style of a user.

In the configuration above, the notification part has a display part, and the display part displays the identification information of the new space, identification information of each of the two or more devices included in the new space, and an icon serving as the collective control information for collectively controlling the two or more devices.

In this configuration, the display part displays the identification information (e.g., space name) of the new space, the identification information (e.g., device name) of the two or more devices included in the new space, and the icon for collectively controlling the two or more devices, providing a user interface easy for a user to understand and control.

In the configuration above, the notification part further notifies, on the basis of the relevance information, individual control information for individually controlling the two or more devices included in the new space.

In this configuration, the individual control information for individually controlling the two or more devices included in the new space is notified in addition to the collective control information, further improving usability for a user.

In the configuration above, the device control part generates the relevance information based on at least one of: years; seasons; months; weekdays; workdays-to-holidays; and time zones.

In this configuration, even in the case that the activity style of the user changes by years, seasons, months, weekdays, workdays-to-holidays, or time zones, the changing activity style can be identified accurately, resulting in an execution of a more appropriate device control.

In the configuration above, the rooms include at least two of a living room, a dining room, and a kitchen.

In the case that the building in this configuration is a house where the living room, the dining room, and the kitchen are not separated by walls, how these rooms are combined varies due to the lifestyle of the resident. Thus, an installation of the control system according to the configuration to the house enables an appropriate creation of a new space for the lifestyle of the resident, increasing the advantage of the installation of the control system.

A program according to an aspect of the present disclosure causes a computer included in a control system for controlling a plurality of devices disposed in a building having a plurality of rooms to serve as: acquiring means for acquiring disposition information and record information indicative of performance record of each of the devices, the disposition information including a relevance between identification information of each of the rooms and identification information of each of the devices disposed in each room; space creating means for creating a new space by combining two or more of the rooms on the basis of the disposition information and the record information acquired by the acquiring means; device control means for generating relevance information indicative of a relevance between identification information of the new space and identification information of two or more devices included in the new space among the devices; and output means for outputting the relevance information to a notification part for notifying, on the basis of the relevance information, collective control information for collectively controlling the two or more devices.

In this configuration, a new space is created by combining two or more of the rooms on the basis of the disposition information and the record information. Further, relevance information indicative of a relevance between identification information of the new space and identification information of two or more devices included in the new space, is generated; and, on the basis of the relevance information, collective control information for collectively controlling the two or more devices is notified. An analysis of the record information indicative of the performance record of each device enables an accurate identification of an activity style of a user of the building, resulting in an execution of an appropriate device control for the activity style.

A control method for controlling a plurality of devices disposed in a building having a plurality of rooms according to an aspect of the present disclosure includes: by a computer, acquiring disposition information and record information indicative of performance record of each of the devices, the disposition information including a relevance between identification information of each of the rooms and identification information of each of the devices disposed in each room; creating a new space by combining two or more of the rooms on the basis of the acquired disposition information and the record information; generating relevance information indicative of a relevance between identification information of the new space and identification information of two or more devices included in the new space among the devices; and notifying by a notification part, on the basis of the relevance information, collective control information for collectively controlling the two or more devices.

In this configuration, a new space is created by combining two or more of the rooms on the basis of the disposition information and the record information. Further, relevance information indicative of a relevance between identification information of the new space and identification information of two or more devices included in the new space is generated; and, on the basis of the relevance information, collective control information for collectively controlling the two or more devices is notified. An analysis of the record information indicative of the performance record of each device enables an accurate identification of an activity style of a user of the building, resulting in an execution of an appropriate device control for the activity style.

A control system for controlling a plurality of devices disposed in a building having a plurality of rooms according to an aspect of the present disclosure includes: an acquiring part for acquiring disposition information and record information indicative of performance record of each of the devices, the disposition information including a relevance between identification information of each of the rooms and identification information of each of the devices disposed in each room; a space creating part for creating a new space by combining two or more of the rooms on the basis of the disposition information and the record information acquired by the acquiring part; a device control part for generating relevance information indicative of a relevance between identification information of the new space and identification information of two or more devices included in the new space among the devices; and a notification part for notifying, on the basis of the relevance information, individual control information for individually controlling the two or more devices.

In this configuration, a new space is created by combining two or more of the rooms on the basis of the disposition information and the record information. Further, relevance information indicative of a relevance between identification information of the new space and identification information of two or more devices included in the new space is generated; and, on the basis of the relevance information, individual control information for individually controlling the two or more devices is notified. An analysis of the record information indicative of the performance record of each device enables an accurate identification of an activity style of a user of the building, resulting in an execution of an appropriate device control for the activity style.

In the configuration above, the space creating part calculates the number of active devices that is the number of devices which are active in each room in the same unit time of a plurality of divisional unit times of a day, and creates the new space by combining two or more rooms each of which has active devices not less than a threshold in number among the rooms.

In this configuration, a combination of the two or more rooms each of which has active devices not less than a threshold in number in the same unit time enables an appropriate creation of a new space for an activity style of a user.

In the configuration above, the space creating part calculates the number of active devices using a preset weighting factor for a device type.

In this configuration, setting a larger weighting factor for a device (e.g., a lamp) with a higher possibility that the user is in a room where the device is active and a calculation with the weighting factor by the space creating part of the number of active devices enable a more appropriate creation of a new space for an activity style of a user.

In the configuration above, the space creating part changes the threshold in accordance with each unit time.

In this configuration, a change of the threshold in accordance with each unit time enables a more appropriate creation of a new space for an activity style of a user.

In the configuration above, the space creating part creates the new space by combining two or more rooms which have two or more devices which have been active within a predetermined time among the devices.

In this configuration, a combination of two or more rooms which have two or more devices which have been active within a predetermined time enables a more appropriate creation of a new space for an activity style of a user.

In the configuration above, the notification part has a display part, and the display part displays the identification information of the new space, identification information of each of the two or more devices included in the new space, and icons serving as the individual control information for individually controlling the two or more devices.

In this configuration, the display part displays the identification information (e.g., space name) of the new space, the identification information (e.g., device name) of the two or more devices included in the new space, and the icons for individually controlling the two or more devices, providing a user interface easy for a user to understand and control.

In the configuration above, the device control part generates the relevance information based on at least one of: years; seasons; months; weekdays; workdays-to-holidays; and time zones.

In this configuration, even in the case that the activity style of the user changes by years, seasons, months, weekdays, workdays-to-holidays, or time zones, the changing activity style can be identified accurately, resulting in an execution of a more appropriate device control.

In the configuration above, the rooms include at least two of a living room, a dining room, and a kitchen.

In the case that the building in this configuration is a house where the living room, the dining room, and the kitchen are not separated by walls, how these rooms are combined varies due to the lifestyle of the resident. Thus, an installation of the control system according to the configuration to the house enables an appropriate creation of a new space for the lifestyle of the resident, increasing the advantage of the installation of the control system.

A program according to an aspect of the present disclosure causes a computer included in a control system for controlling a plurality of devices disposed in a building having a plurality of rooms to serve as: acquiring means for acquiring disposition information and record information indicative of performance record of each of the devices, the disposition information including a relevance between identification information of each of the rooms and identification information of each of the devices disposed in each room; space creating means for creating a new space by combining two or more of the rooms on the basis of the disposition information and the record information acquired by the acquiring means; device control means for generating relevance information indicative of a relevance between identification information of the new space and identification information of two or more devices included in the new space among the devices; and output means for outputting the relevance information to a notification part for notifying, on the basis of the relevance information, individual control information for individually controlling the two or more devices.

In this configuration, a new space is created by combining two or more of the rooms on the basis of the disposition information and the record information. Further, relevance information indicative of a relevance between identification information of the new space and identification information of two or more devices included in the new space is generated; and, on the basis of the relevance information, individual control information for individually controlling the two or more devices is notified. An analysis of the record information indicative of the performance record of each device enables an accurate identification of an activity style of a user of the building, resulting in an execution of an appropriate device control for the activity style.

A control method for controlling a plurality of devices disposed in a building having a plurality of rooms according to an aspect of the present disclosure includes: by a computer, acquiring disposition information and record information indicative of performance record of each of the devices, the disposition information including a relevance between identification information of each of the rooms and identification information of each of the devices disposed in each room; creating a new space by combining two or more of the rooms on the basis of the acquired disposition information and the record information; generating relevance information indicative of a relevance between identification information of the new space and identification information of two or more devices included in the new space among the devices; and notifying by a notification part, on the basis of the relevance information, individual control information for individually controlling the two or more devices.

In this configuration, a new space is created by combining two or more of the rooms on the basis of the disposition information and the record information. Further, relevance information indicative of a relevance between identification information of the new space and identification information of two or more devices included in the new space is generated; and, on the basis of the relevance information, individual control information for individually controlling the two or more devices is notified. An analysis of the record information indicative of the performance record of each device enables an accurate identification of an activity style of a user of the building, resulting in an execution of an appropriate device control for the activity style.

This disclosure can be realized as: a program for causing a computer to execute each distinctive feature included in such a system; or a system operated by the program. Additionally, it goes without saying that the program is distributable as a non-transitory computer readable storage medium like a CD-ROM, or distributable via a communication network like the Internet.

Embodiments of Present Disclosure

Embodiments of the present disclosure will be described below with reference to the drawings. The elements given the same reference numerals in different drawings are defined to be the same or like elements. Constituent elements, dispositions thereof, connections therebetween, and the order of operations described below are mere examples, and thus should not be construed to delimit the disclosure. Only the claims delimit the present disclosure. Hence, constituent elements which are not recited in the independent claims each showing the broadest concept among the constituent elements in the embodiments are described as being ones not necessarily required to accomplish the object of the present disclosure but required to achieve preferable configurations.

FIG. 1 is a diagram showing a whole structure of a home control system according to an embodiment of the present disclosure. The home control system includes a smart home 100, a communication network 500, and a server 400. Only one smart home 100 is shown in FIG. 1 for a brief explanation, but a plurality of smart homes may be included.

The smart home 100 has a plurality of rooms (e.g., a chamber, a bathroom, a toilet, an entrance, a corridor) in which a plurality of devices 300, which are the control target, is disposed. The smart home 100 includes an integral controller 200 for controlling operations of the devices 300. The integral controller 200 can perform mutual data communication with each of the devices 300 through a communication network such as a wireless LAN or a public network.

The server 400 is a control device adapted for managing and controlling the whole home control system. The communication network 500 is, for example, a public network. The communication network 500 is connected with the server 400, the integral controller 200, and the devices 300, which thus enables the server 400 to perform mutual data communication with the integral controller 200 and the devices 300 through the communication network 500.

Figure 2:
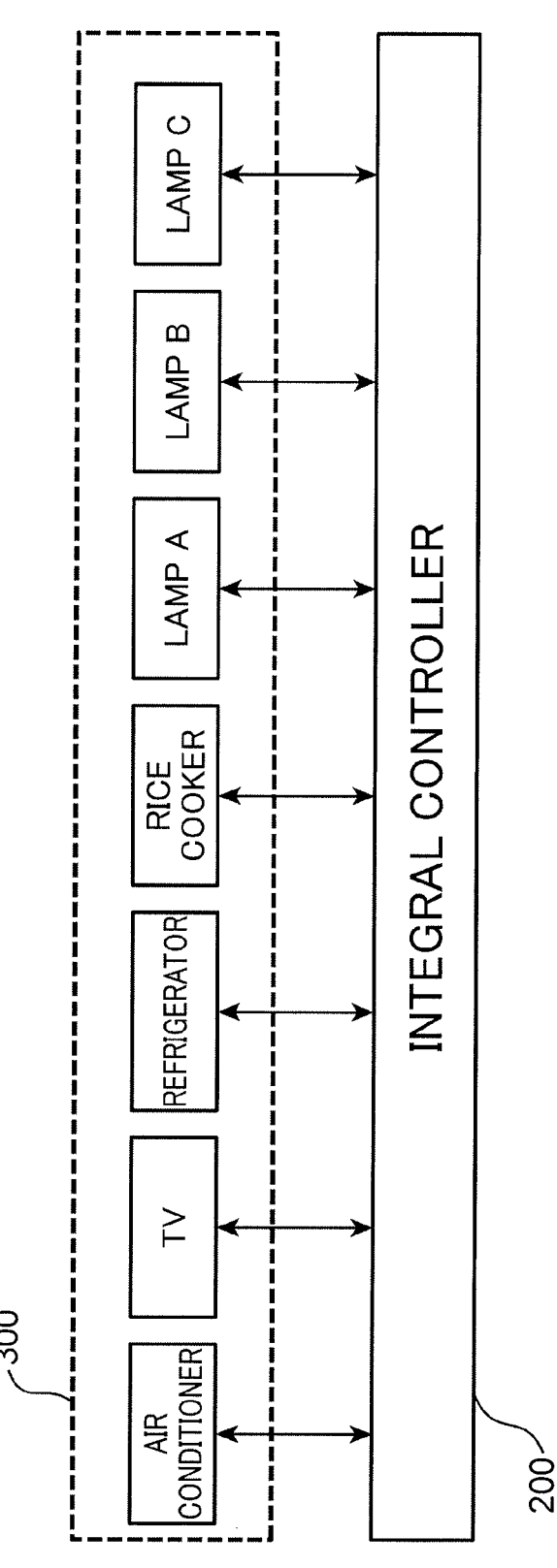
FIG. 2 is an illustration showing specific devices.

FIG. 2 is an illustration showing specific devices 300. As shown therein, the devices 300 are IoT devices, e.g., an air conditioner, a TV, a refrigerator, a rice cooker, and a lamp. Each device 300 is connected with the integral controller 200 through the communication network.

Figure 3:
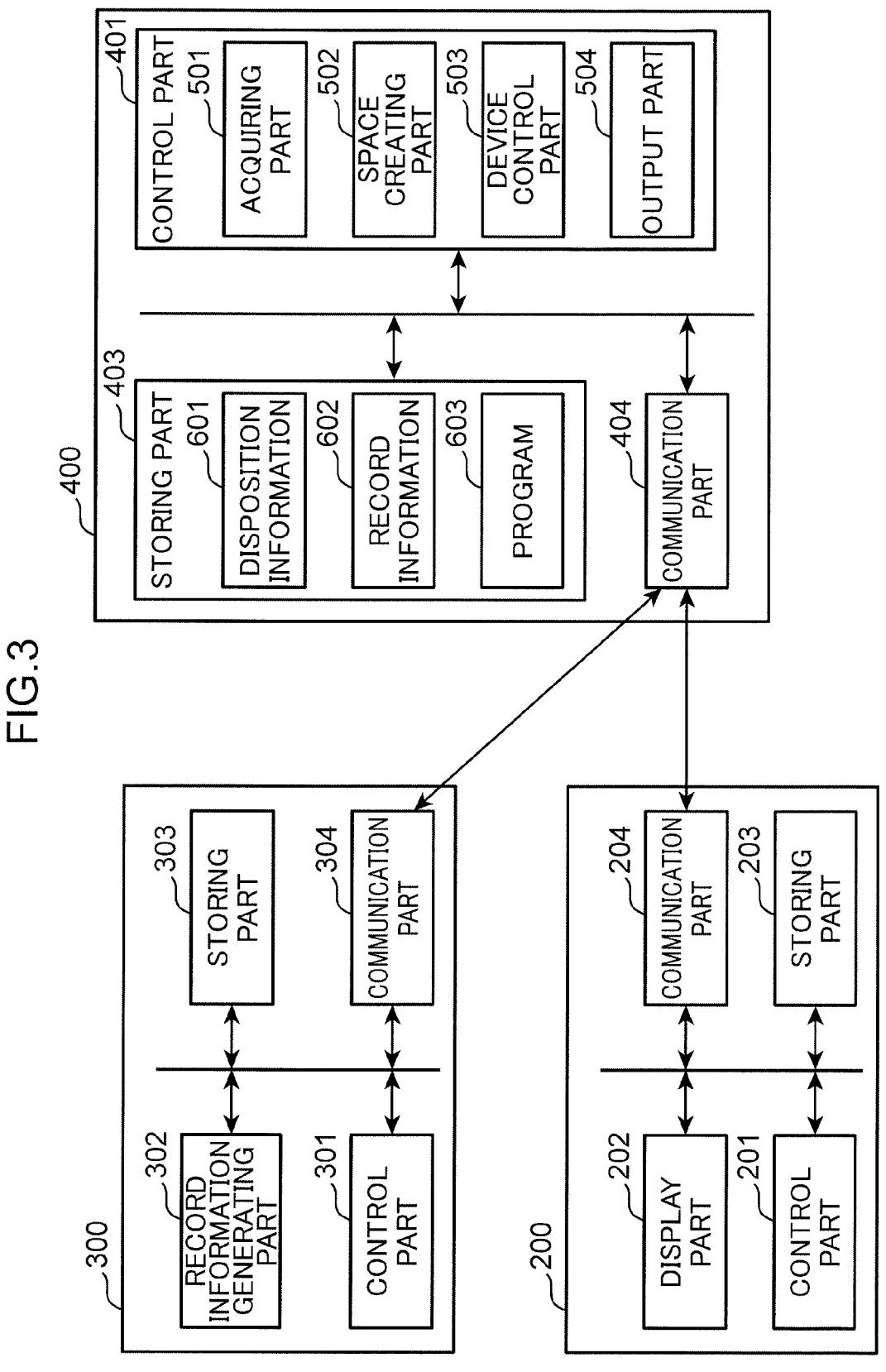
FIG. 3 is a diagram showing a first exemplary configuration of the system.

FIG. 3 is a diagram showing a first exemplary configuration of the system. The home control system includes an integral controller 200, devices 300, and a server 400 (control device).

Each device 300 includes a control part 301, a record information generating part 302, a storing part 303, and a communication part 304. The control part 301 and the record information generating part 302 do performance when a CPU executes a certain program. The storing part 303 includes, for example, a flash memory. The communication part 304 includes a communication module compatible with a communication system such as an IP. The record information generating part 302 stores record information indicative of performance record of the device 300 in the storing part 303. The performance record includes at least information indicative of a timing (including year, month, day, and time) of switch-on or switch-off of the device 300. In a case that the device 300 is an air conditioner, the performance record may include information indicative of a set temperature; in a case that the device 300 is a lamp, the performance record may include information indicative of a light control degree.

The integral controller 200 includes a control part 201, a display part 202, a storing part 203, and a communication part 204. The control part 201 does performance when a CPU executes a certain program. The display part 202 is, for example, a liquid-crystal or organic EL touchscreen display. The storing part 203 includes, for example, an HDD, an SSD, or a flash memory. The communication part 204 includes a communication module compatible with a communication system such as an IP.

The server 400 includes a control part 401, a storing part 403, and a communication part 404. The storing part 403 includes, for example, an HDD, an SSD, or a flash memory. The storing part 403 stores disposition information 601, record information 602, and a program 603. The record information 602 is an accumulation of short period record information in a long period, the short period record information having been stored in the storing part 303 of the device 300 and periodically transmitted from the device 300. The control part 401 includes an acquiring part 501, a space creating part 502, a device control part 503, and an output part 504, which are established by rendering a CPU to execute the program 603 read in a ROM or a RAM from the storing part 403. The functions of these parts will be described later. The communication part 404 includes a communication module compatible with a communication system such as an IP.

Figure 4:
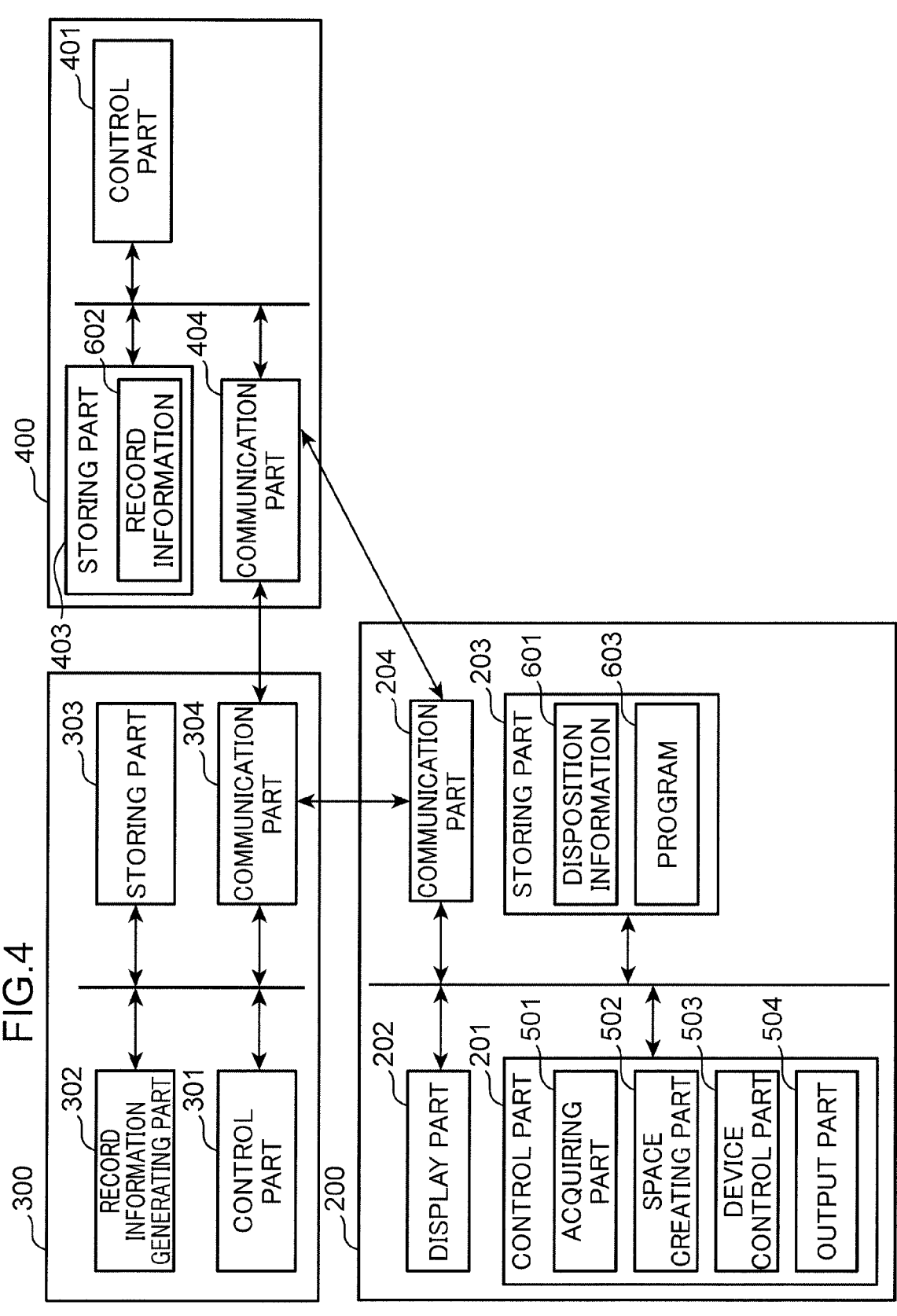
FIG. 4 is a diagram showing a second exemplary configuration of the system.

FIG. 4 is a diagram showing a second exemplary configuration of the system. The home control system includes an integral controller 200 (control device), devices 300, and a server 400.

The integral controller 200 includes a control part 201, a display part 202, a storing part 203, and a communication part 204. The storing part 203 stores disposition information 601 and a program 603. The control part 201 includes an acquiring part 501, a space creating part 502, a device control part 503, and an output part 504, which are established by rendering a CPU to execute the program 603 read in a ROM or a RAM from the storing part 203.

The server 400 includes a control part 401, a storing part 403, and a communication part 404. The storing part 403 stores record information 602.

Figure 5:
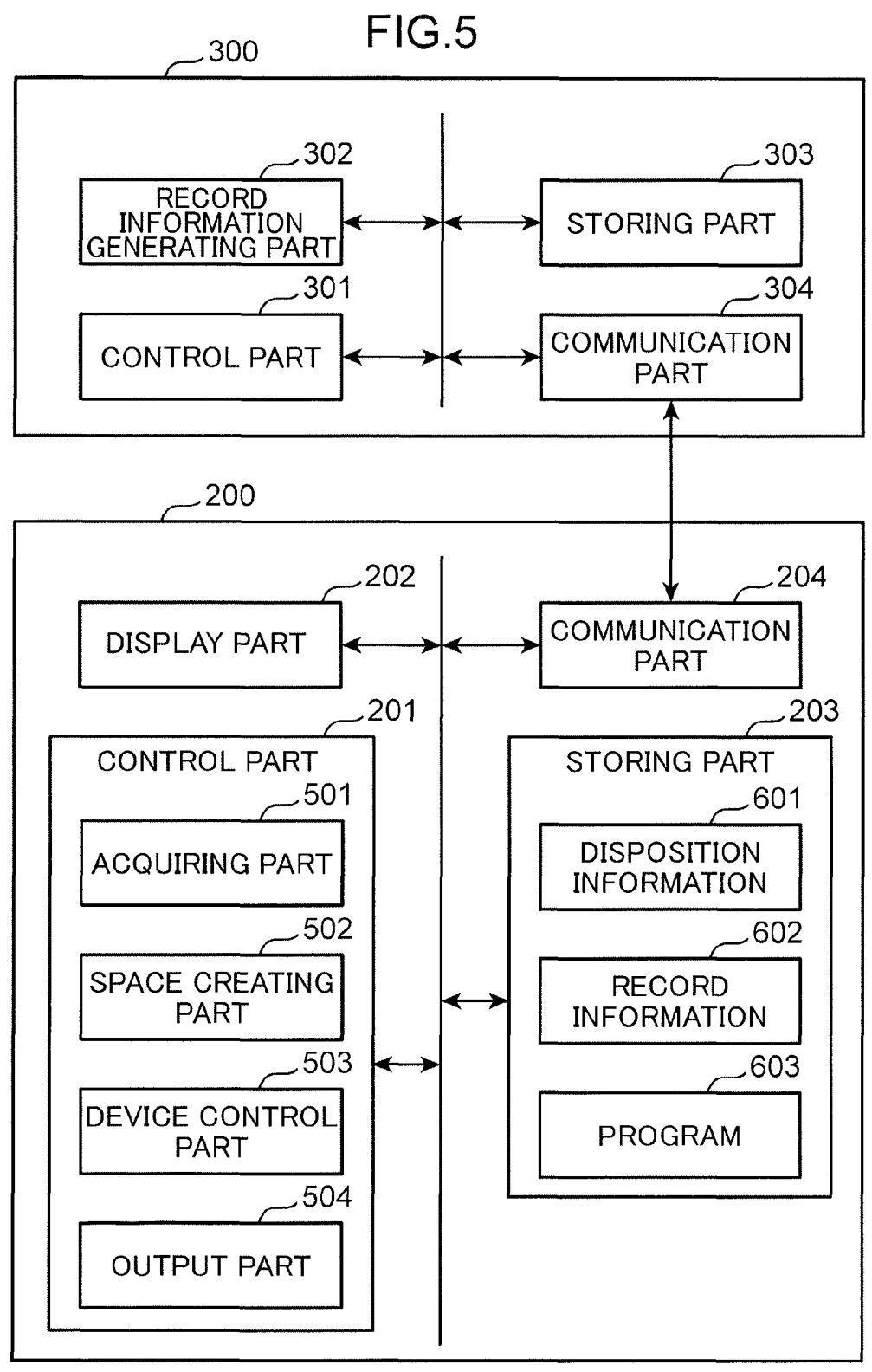
FIG. 5 is a diagram showing a third exemplary configuration of the system.

FIG. 5 is a diagram showing a third exemplary configuration of the system. The home control system includes an integral controller 200 (control device) and devices 300.

The integral controller 200 includes a control part 201, a display part 202, a storing part 203, and a communication part 204. The storing part 203 stores disposition information 601, record information 602, and a program 603. The control part 201 includes an acquiring part 501, a space creating part 502, a device control part 503, and an output part 504, which are established by rendering a CPU to execute the program 603 read in a ROM or a RAM from the storing part 203.

The following description will be made about the case of the configuration of the system shown in FIG. 3.

Figure 6:
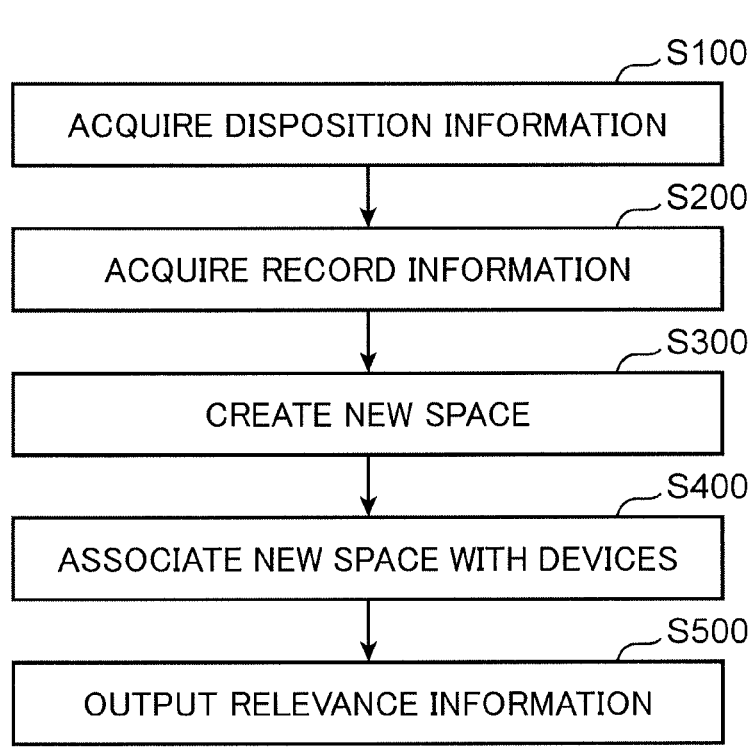
FIG. 6 is a flowchart showing steps of a process executed by a control part.

FIG. 6 is a flowchart showing steps of a process executed by the control part 401 of the server 400. The control part 401 generates relevance information, which will be described later, based on at least one of: years; seasons;

months; weekdays; workdays-to-holidays; and time zones, by executing a process below. Thus, even in the case that the activity style of the user changes by years, seasons, months, weekdays, workdays-to-holidays, or time zones, the changing activity style can be identified accurately, resulting in an execution of a more appropriate device control.

First, the acquiring part 501 acquires disposition information 601 in Step S100 by reading the disposition information 601 from the storing part 403.

FIG. 7 is an illustration briefly showing an example of the disposition information 601. In the case that there is a plurality of smart homes which are the management target, the disposition information 601 is created for each smart home 100. The disposition information 601 is created by an operator of a management company when the system is installed in the smart home 100, or alternatively may be created by a resident of the smart home 100 instead of the operator; and may be created after the installation of the system instead of the timing of the installation thereof.

The disposition information 601 includes a relevance between: identification information (room ID and room name) of each of a plurality of rooms of the smart home 100; and identification information (device ID and device name) of each device 300 disposed in each room. In the example, in the living room (room ID: R1), an air conditioner (device ID: A01), a main lamp (device ID: A02), an indirect lamp (device ID: A03), and a TV (device ID: A04) are disposed. In the dining room (room ID: R2), a main lamp (device ID: A05), an indirect lamp (device ID: A06), and an air conditioner (device ID: A07) are disposed. In the kitchen (room ID: R3), a lamp (device ID: A08) and a ventilator (device ID: A09) are disposed. The management target is not limited to a chamber (space defined by walls), and may include a space (e.g., entrance or corridor) not defined by walls.

With reference to FIG. 6, the acquiring part 501 then acquires record information 602 in Step S200 by reading the record information 602 from the storing part 403.

Figure 8:
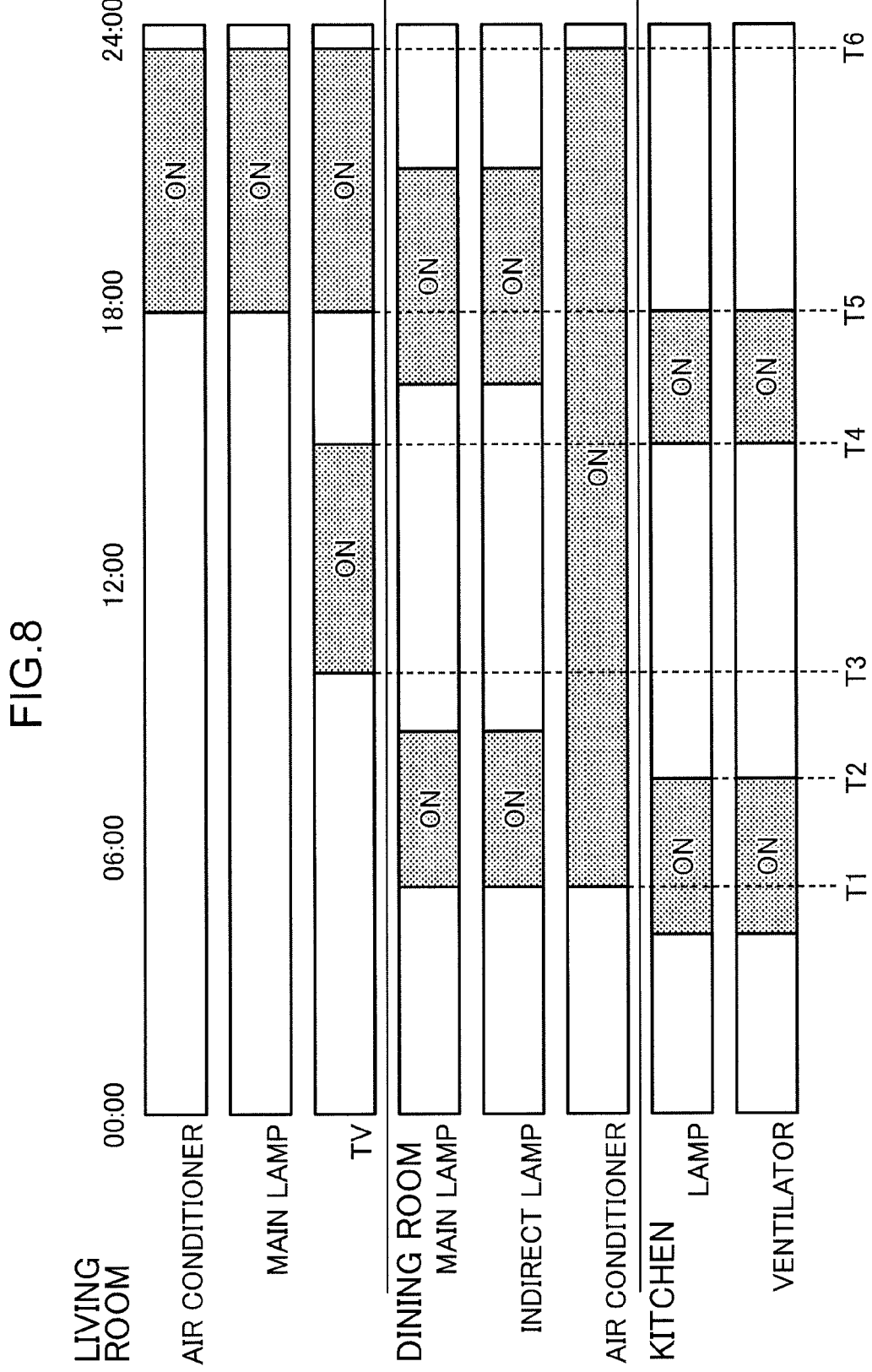
FIG. 8 is an illustration briefly showing an example of record information.

FIG. 8 is an illustration briefly showing an example of the record information 602. In the example, the record information 602 represents a heatmap indicating what time of a day each device 300 disposed in each room of the smart home 100 has been active. The heatmap differentiates, among 24 divisional unit times of a day by one hour, a unit time during which a device 300 has been active from a unit time during which the device 300 has not been active, on the basis of, for example, a setting of flag information. The heatmap is created by the control part 301 of the device 300, or may be created by the control part 401 of the server 400. The length of the unit time is not limited to one hour, and may be several tens of minutes or several hours. The record information 602 is not necessarily represented by a graph in the form of heatmap.

With reference to FIG. 6, the space creating part 502 then creates a new space in Step S300 by combining two or more of the rooms of the smart home 100 having devices 300 of which active periods are related to (overlap with or follow) each other, on the basis of the disposition information 601 and the record information 602 acquired by the acquiring part 501.

Figure 9:
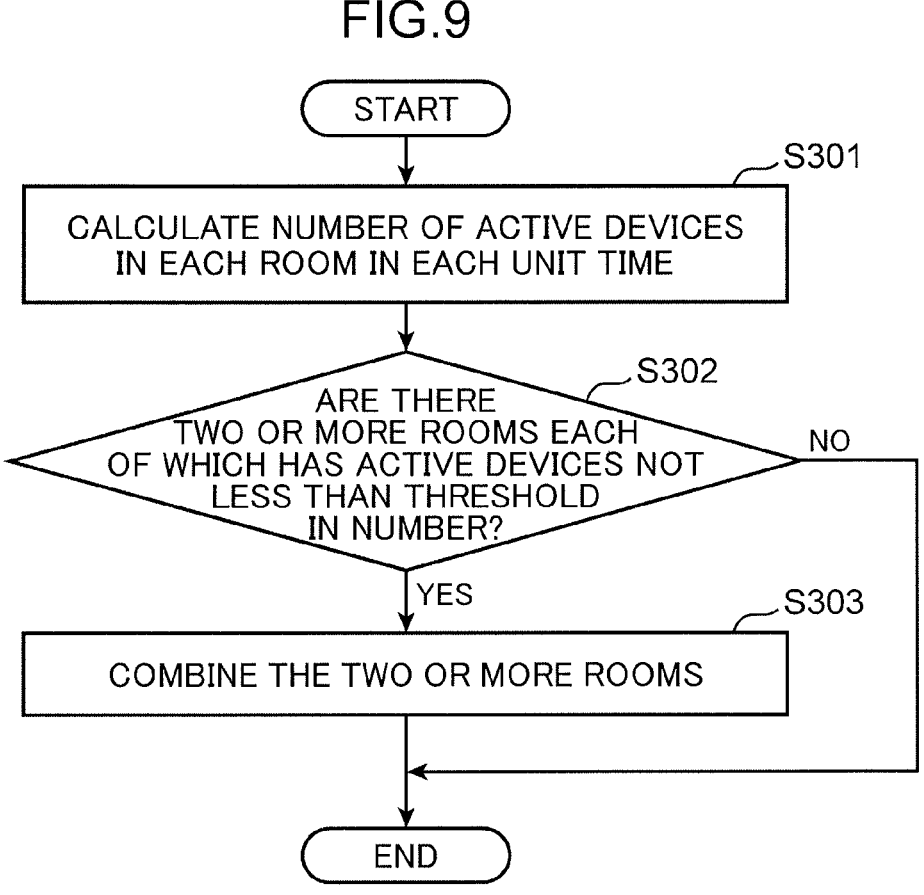
FIG. 9 is a flowchart showing a first exemplary specific process of space creation.

FIG. 9 is a flowchart showing a first exemplary specific process in Step S300. First, in Step S301, the space creating part 502 calculates, per unit time, the number of devices 300 (the number of active devices) which have been active in each room of the smart home 100 in the same unit time. For example, in FIG. 8, the number of active devices in the unit time of 06:00 to 07:00 in the dining room is "3", and the number of active devices in the unit time of 12:00 to 13:00 in the living room is "1".

In the calculation, the space creating part 502 may calculate the number of active devices using a preset weighting factor for a type of a device 300. A relatively large weighting factor W1 is set for a device 300 with a high possibility that the resident is in a room where the device 300 is active. A relatively small weighting factor W2 is set for a device 300 with a possibility that the resident is not always in a room where the device 300 is active. For example, the weighting factor W1 is set for a lamp and the weighting factor W2 is set for an air conditioner and a TV; the value of the weighting factor W1 is set to "2" and the value of the weighting factor W2 is set to "1". In this case, in the example shown in FIG. 8, the number of active devices in the unit time of 18:00 to 19:00 in the living room is "4", and the number of active devices in the unit time of 18:00 to 19:00 in the dining room is "5".

As described above, setting a larger weighting factor for a device 300 (e.g., a lamp) with a higher possibility that the user is in a room where the device is active and a calculation with the weighting factor by the space creating part 502 of the number of active devices enable a more appropriate creation of a new space for an activity style of a user. The weighting factor may be arbitrarily changed by the user, or may be changed automatically. For example, the weighting factor may be determined by linear algebra or machine learning after obtaining information on operational states (e.g., states of switch-on or switch-off) of the devices 300 in a time zone and on presence or absence of a person by questionnaire search or the like. This enables an effective creation of a space that corresponds to an activity space where a person actually is present in their life.

The space creating part 502 then determines in Step S302 whether or not there are two or more rooms each of which has active devices not less than a predetermined threshold in number in each unit time.

If there are two or more rooms each of which has active devices not less than the threshold in number in a unit time (YES in Step S302), the space creating part 502 then creates in Step S303 a new space by combining the two or more rooms for the unit time.

In the case that the threshold is set to "1" in the example shown in FIG. 8, the space creating part 502 creates a new space of "DINING KITCHEN" by combining the dining room and the kitchen for each unit time of T1 to T2 and T4 to T5. The space creating part 502 also creates a new space of "LIVING-DINING ROOM" by combining the living room and the dining room for each unit time of T3 to T4 and T5 to T6.

In the example shown in FIG. 9, a combination of two or more rooms each of which has active devices 300 not less than a threshold in number in the same unit time enables an appropriate creation of a new space for an activity style of a user.

The space creating part 502 may change the threshold in accordance with each unit time on the basis of preset table information. A change of the threshold in accordance with each unit time enables a more appropriate creation of a new space for an activity style of a user.

Figure 10:
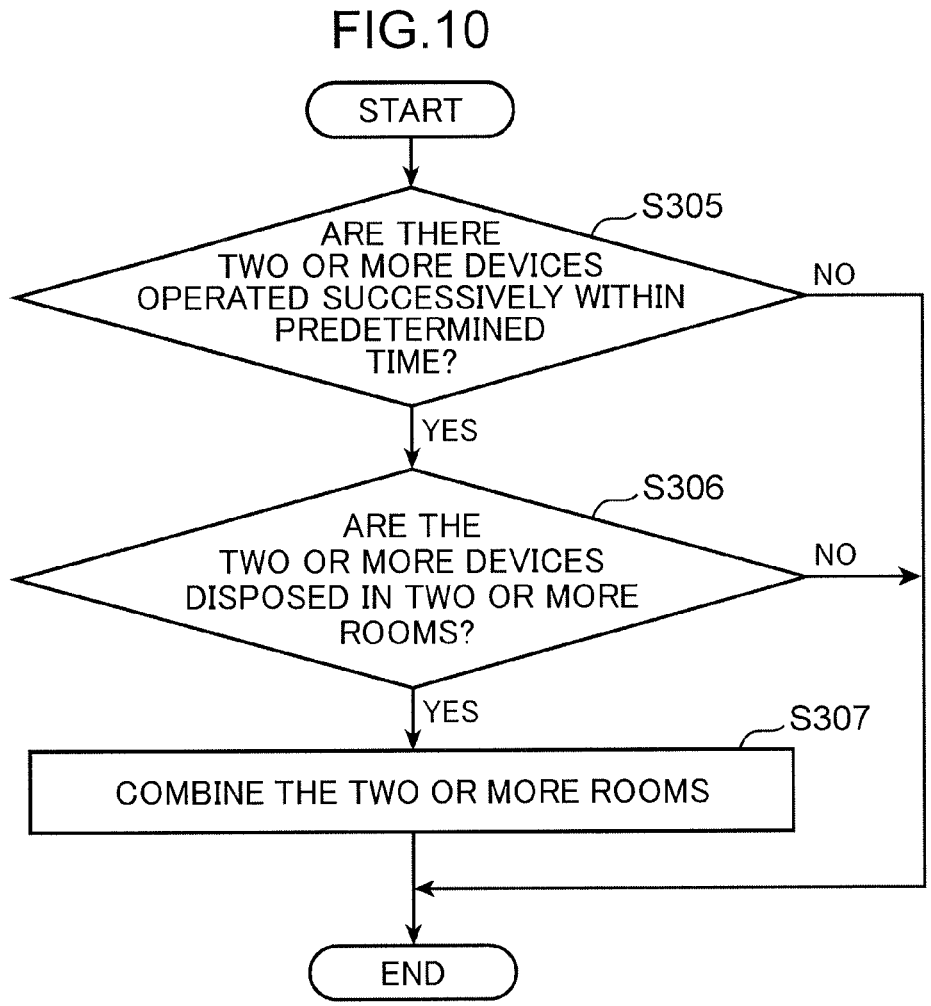
FIG. 10 is a flowchart showing a second exemplary specific process of the space creation.

FIG. 10 is a flowchart showing a second exemplary specific process in Step S300. First, the space creating part 502 determines in Step S305 on the basis of the record information 602 whether or not there are two or more devices 300 operated successively within a predetermined time (e.g., within ten seconds to one minute).

If there are two or more devices 300 successively operated in a unit time (YES in Step S305), the space creating part 502 then determines in Step S306 whether or not the two or more devices 300 are disposed in two or more rooms.

If the two or more devices 300 are disposed in two or more rooms (YES in Step S306), the space creating part 502 then creates in Step S307 a new space by combining the two or more rooms for the unit time.

In a case that an air conditioner in the dining room is switched on just after a main lamp in the living room is switched on during a unit time, the space creating part 502 creates a new space of "LIVING-DINING ROOM" for the unit time by combining the living room and the dining room.

In a case that, during a unit time, a lamp in the corridor is switched on just after a lamp in the bed room is switched on, and soon thereafter a lamp in the toilet is switched on, the space creating part 502 creates a new space of "TRAFFIC LINE FROM BED ROOM TO TOILET" for the unit time by combining the bed room, the corridor, and the toilet.

In the example shown in FIG. 10, a combination of two or more rooms which have two or more devices 300 which have been active (successively operated) within a predetermined time enables a more appropriate creation of a new space for an activity style of a user.

In Step S300, a new space is created, which is different from the rooms that have been defined in the disposition information 601. The disposition information 601 initially created by an operator of a management company or a resident includes a relevance, recorded on the basis of each room name written on an architectural drawing or each floor plan, between identification information of each room and identification information of each device 300. The new space created in Step S300 is one that has not been represented by the room names on the architectural drawing or each floor plan.

With reference to FIG. 6, the device control part 503 then assigns in Step S400 identification information (including ID and name) to the new space created in Step S300. The device control part 503 associates the identification information with identification information of two or more devices included in the new space to generate relevance information indicative of a relevance therebetween. For example, in the case that a new space is created by combining "LIVING ROOM" and "DINING ROOM" in the example shown in FIG. 7, the device control part 503 assigns a new room ID (e.g., "R12") and a new name (e.g., "LIVING-DINING ROOM") to the new space. Further, the device control part 503 associates the new room ID (R12) with the device IDs (A01 to A07) of two or more devices 300 disposed in the living room and the dining room to generate relevance information.

With reference to FIG. 6, the output part 504 then outputs in Step S500 the relevance information generated in Step S400.

With reference to FIGS. 1 and 3, the relevance information output by the output part 504 is input to the communication part 404. The communication part 404 transmits the input relevance information to the integral controller 200 through the communication network 500. The communication part 204 of the integral controller 200 receives and inputs the relevance information to the control part 201. The control part 201 creates display data on the basis of the input relevance information. The control part 201 inputs the created display data to the display part 202. The display part 202 displays a control screen on the basis of the input display data. In this regard, the notification is not limited to by way of display, and may be by way of sound output. The notification also includes an output of display data or sound data to a device having a display part or a sound output part.

First Embodiment

Figure 11:
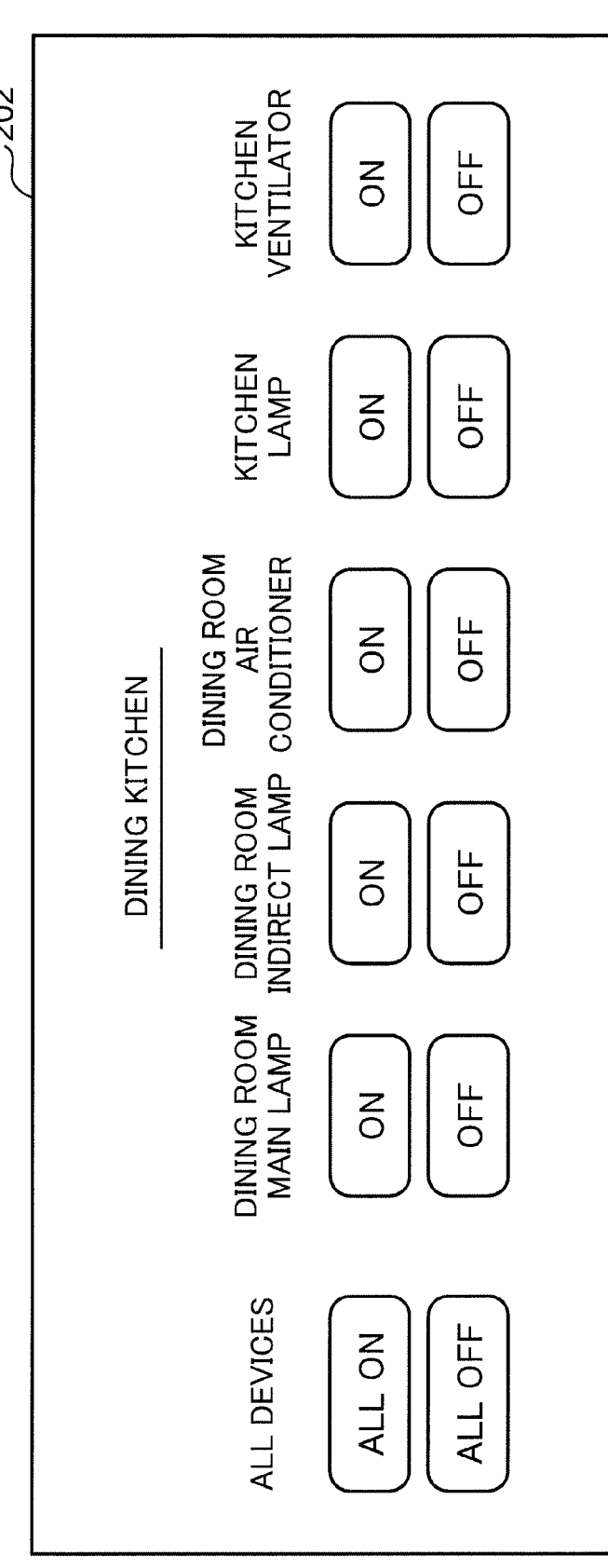
FIG. 11 is an illustration showing a first exemplary control screen displayed on a display part in a first embodiment.

FIG. 11 is an illustration showing a first exemplary control screen displayed on a display part 202 in the first embodiment of the present disclosure. An exemplary control screen for a unit time displayed on the display part 202 for a new space of "DINING KITCHEN" resulting from a combination of the dining room and the kitchen for the unit time will be described below. In the example shown in FIG. 7, the new space of "DINING KITCHEN" includes the main lamp (device ID: A05), the indirect lamp (device ID: A06), and the air conditioner (device ID: A07) in the dining room and the lamp (device ID: A08) and the ventilator (device ID: A09) in the kitchen.

With reference to FIG. 11, the control screen includes a text representing the name of "DINING KITCHEN", indi- vidual control information for individually controlling the devices 300 included in the dining kitchen, and collective control information for collectively controlling the devices 300 included in the dining kitchen.

The individual control information includes texts repre- senting the name of each device 300 ("DINING ROOM MAIN LAMP", "DINING ROOM INDIRECT LAMP", "DINING ROOM AIR CONDITIONER", "KITCHEN LAMP", and "KITCHEN VENTILATOR") and tactile icons for switching on or off each device 300. For example, when an icon of switch-on for "DINING ROOM MAIN LAMP" is touched, the integral controller 200 switches on the main lamp disposed in the dining room by remote control through the communication network. When an icon of switch-off for "KITCHEN VENTILATOR" is touched, the integral con- troller 200 switches off the ventilator disposed in the kitchen by remote control through the communication network.

The collective control information includes a text repre- senting "ALL DEVICES", an icon of switch-on, and an icon of switch-off. When the icon of switch-on is touched, the integral controller 200 switches on all of the devices 300 ("DINING ROOM MAIN LAMP", "DINING ROOM INDIRECT LAMP", "DINING ROOM AIR CONDI- TIONER", "KITCHEN LAMP", and "KITCHEN VENTI- LATOR") included in the dining kitchen by remote control through the communication network. When the icon of switch-off is touched, the integral controller 200 switches off all of the devices 300 included in the dining kitchen by remote control through the communication network.

The configuration of the collective control information is not limited to one in which all of the devices 300 included in the new space are the control target, and may be one allowing the user to exclude a desired device 300 from or add it to the target by manual setting, one allowing a specific setting for a desired device 300, or one in which only the devices 300 that have been active in the same unit time in the record information 602 are the target (and the devices 300 that have not been active therein are excluded from the target).

Figure 12:
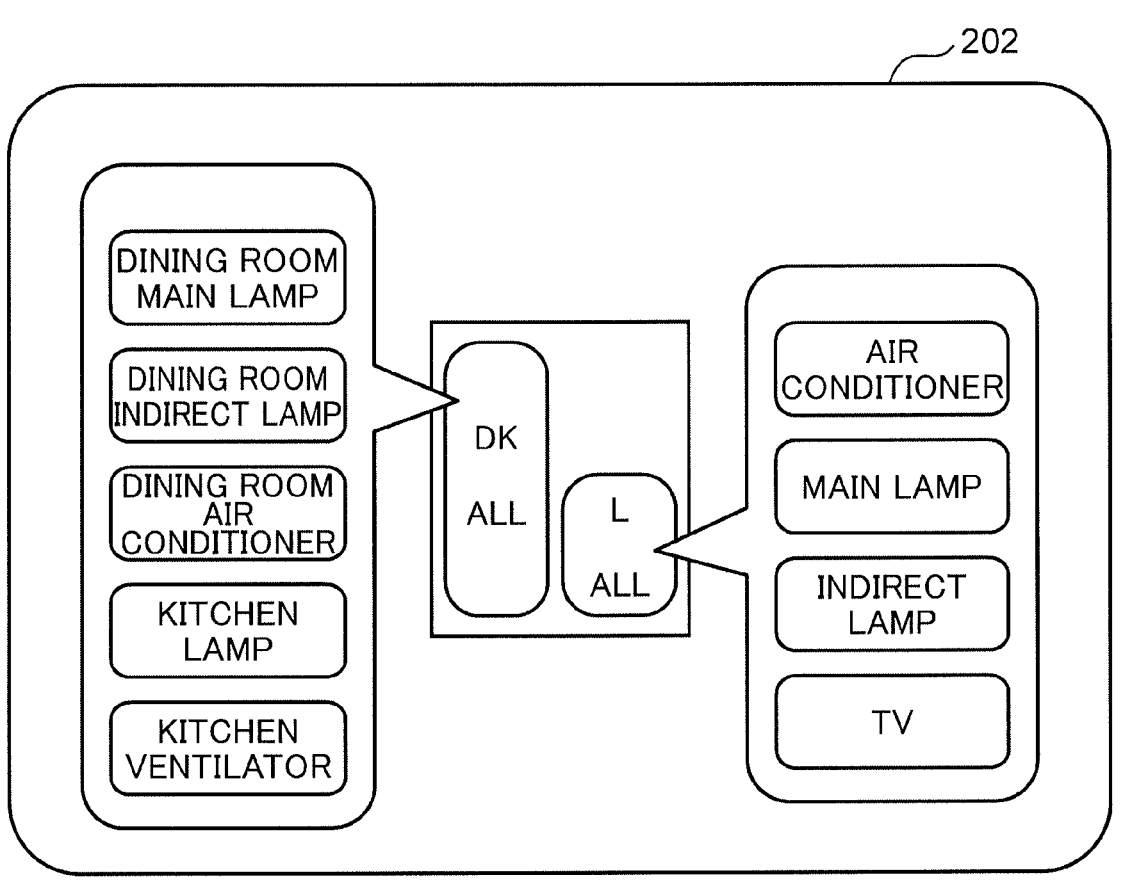
FIG. 12 is an illustration showing a second exemplary control screen displayed on the display part in the first embodiment.

FIG. 12 is an illustration showing a second exemplary control screen displayed on the display part 202 in the first embodiment of the present disclosure. The control screen includes collective control information including icons implying the layout of the dining kitchen (DK) and the living room (L), and individual control information for individu- ally controlling the respective devices 300 included in the dining kitchen and the living room.

In the collective control information, for example, when an icon representing "DK" is touched during a time shorter than a predetermined time, the integral controller 200 switches on all of the devices 300 included in the dining kitchen by remote control through the communication net- work; and when the icon representing "DK" is touched during a time not shorter than the predetermined time, the integral controller 200 switches off all of the devices 300 included in the dining kitchen by remote control through the communication network. As a modification, instead of con- trolling switch-on and switch-off on the basis of the duration of a touch under the collective control, an icon of switch-on and an icon of switch-off for the collective control may be displayed visually, though not shown in FIG. 12.

In the individual control information, for example, an icon for a device 300 that is active is bright, and an icon for a device 300 that is inactive is dark. When an icon that is bright is touched, the integral controller 200 switches off the device 300 that corresponds to the icon by remote control through the communication network. When an icon that is dark is touched, the integral controller 200 switches on the device 300 that corresponds to the icon by remote control through the communication network. As a modification, an icon of switch-on and an icon of switch-off for the individual control may be displayed for each device 300 as shown in FIG. 11, though not shown in FIG. 12.

Figure 13:
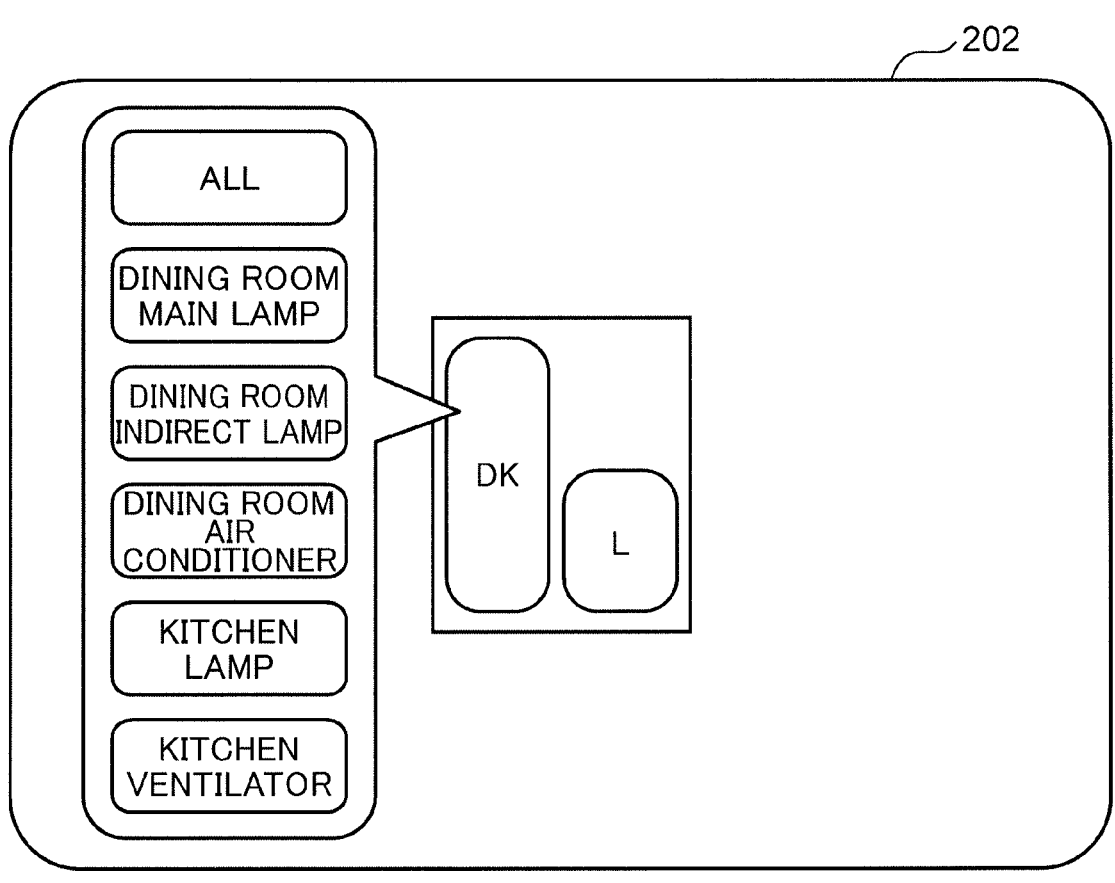
FIG. 13 is an illustration showing a third exemplary control screen displayed on the display part in the first embodiment.

FIG. 13 is an illustration showing a third exemplary control screen displayed on the display part 202 in the first embodiment of the present disclosure. The control screen includes icons implying the layout of the dining kitchen (DK) and the living room (L). For example, when an icon representing "DK" is touched, a pop-up window for the dining kitchen is displayed. The pop-up window includes individual control information for individually controlling the devices 300 included in the dining kitchen and collective control information for collectively controlling the devices 300 included in the dining kitchen.

In the individual control information, for example, an icon for a device 300 that is active is bright, and an icon for a device 300 that is inactive is dark. When an icon that is bright is touched, the integral controller 200 switches off the device 300 that corresponds to the icon by remote control through the communication network. When an icon that is dark is touched, the integral controller 200 switches on the device 300 that corresponds to the icon by remote control through the communication network. As a modification, an icon of switch-on and an icon of switch-off for the individual control may be displayed for each device 300 as shown in FIG. 11, though not shown in FIG. 13.

In the collective control information, for example, when the icon representing "ALL" is touched during a time shorter than a predetermined time, the integral controller 200 switches on all of the devices 300 included in the dining kitchen by remote control through the communication net- work; and when the icon representing "ALL" is touched during a time not shorter than the predetermined time, the integral controller 200 switches off all of the devices 300 included in the dining kitchen by remote control through the communication network. As a modification, instead of con- trolling switch-on and switch-off on the basis of the duration of a touch under the collective control, an icon of switch-on and an icon of switch-off for the collective control may be displayed visually, though not shown in FIG. 13.

In a home control system in the embodiment, a new space is created by combining two or more of the rooms on the basis of the disposition information 601 and the record information 602. Further, relevance information indicative of a relevance between identification information of the new space and identification information of two or more devices 300 included in the new space is generated; and, on the basis of the relevance information, collective control information for collectively controlling the two or more devices is notified. An analysis of the record information 602 indicative of the performance record of each device 300 enables an accurate identification of an activity style of a resident of the house, resulting in an execution of an appropriate device control for the activity style.

Further, the home control system in the embodiment is effective for a smart home 100 that has a living room, a dining room, and a kitchen without wall partition, where how these rooms are combined varies due to the lifestyle of the resident. Accordingly, an installation of the system in the embodiment in such a house enables an appropriate creation of a new space for the lifestyle of the resident, increasing the advantage of the installation of the system.

In the home control system in the embodiment, the display part 202 displays the identification information (e.g., space name) of the new space, identification information (e.g., device name) of the two or more devices 300 included in the new space, and an icon serving as the collective control information for collectively controlling switch-on or switch-off of the two or more devices, providing a user interface easy for a user to understand and control.

The home control system in the embodiment gives a notification with icons serving as the individual control information for individually controlling the two or more devices 300 included in the new space in addition to the icon serving as the collective control information, further improving usability for a user.

Second Embodiment

Figure 14:
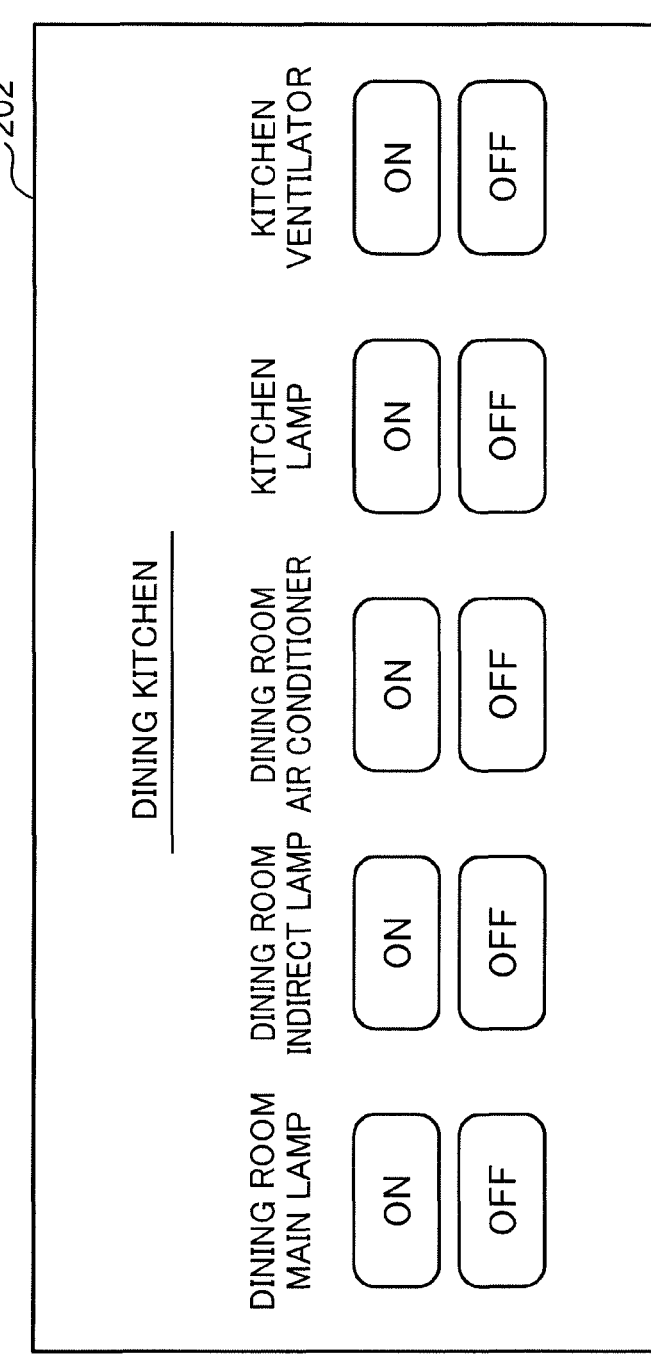
FIG. 14 is an illustration showing a first exemplary control screen displayed on a display part in a second embodiment.

FIG. 14 is an illustration showing a first exemplary control screen displayed on the display part 202 in the second embodiment of the present disclosure. An exemplary control screen for a unit time displayed on the display part 202 for a new space of "DINING KITCHEN" resulting from a combination of the dining room and the kitchen for the unit time will be described below. In the example shown in FIG. 7, the new space of "DINING KITCHEN" includes the main lamp (device ID: A05), the indirect lamp (device ID: A06), and the air conditioner (device ID: A07) in the dining room and the lamp (device ID: A08) and the ventilator (device ID: A09) in the kitchen.

With reference to FIG. 14, the control screen includes a text representing the name of "DINING KITCHEN", and individual control information for individually controlling the devices 300 included in the dining kitchen.

The individual control information includes texts representing the name of each device 300 ("DINING ROOM MAIN LAMP", "DINING ROOM INDIRECT LAMP", "DINING ROOM AIR CONDITIONER", "KITCHEN LAMP", and "KITCHEN VENTILATOR") and tactile icons for switching on or off each device 300. For example, when an icon of switch-on for "DINING ROOM MAIN LAMP" is touched, the integral controller 200 switches on the main lamp disposed in the dining room by remote control through the communication network. When an icon of switch-off for "KITCHEN VENTILATOR" is touched, the integral controller 200 switches off the ventilator disposed in the kitchen by remote control through the communication network.

The configuration of the individual control information is not limited to one in which all of the devices 300 included in the new space are the control target, and may be one allowing the user to exclude a desired device 300 from or add it to the target by manual setting, one allowing a specific setting for a desired device 300, or one in which only the devices 300 that have been active in the same unit time in the record information 602 are the target (and the devices 300 that have not been active therein are excluded from the target).

Figure 15:
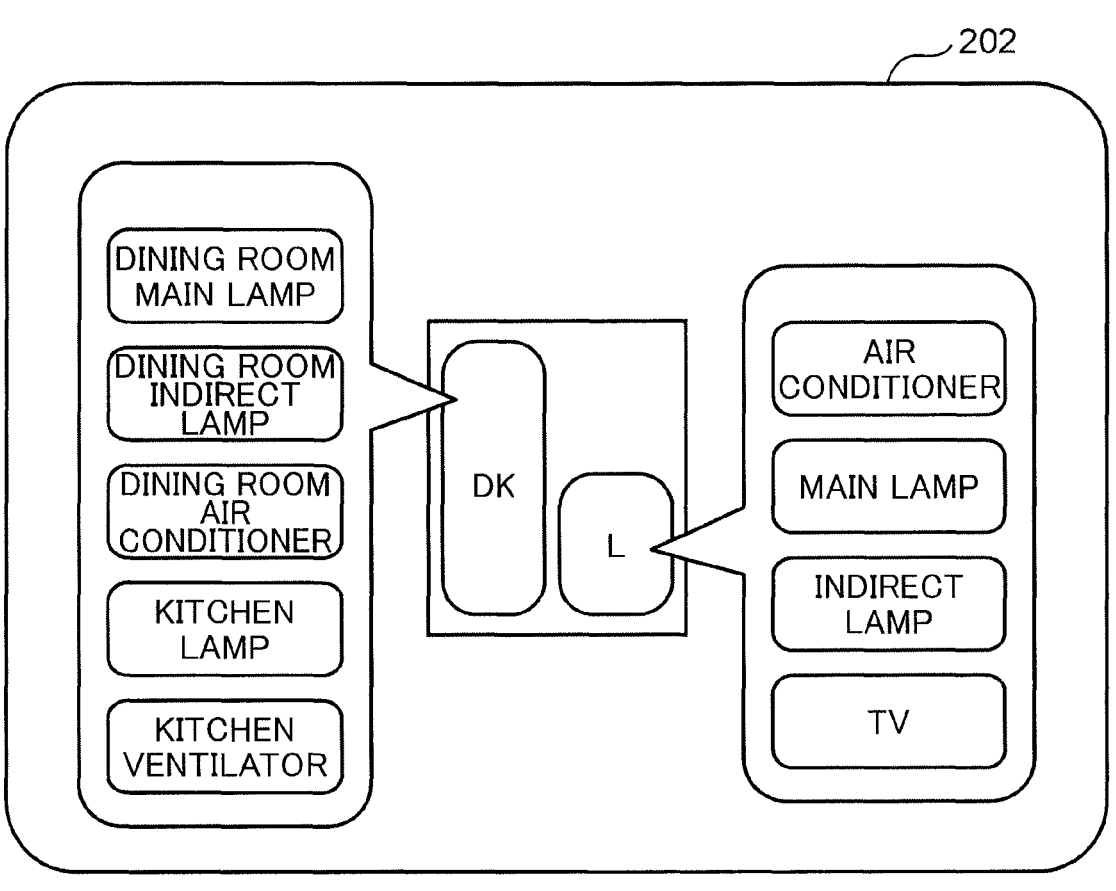
FIG. 15 is an illustration showing a second exemplary control screen displayed on the display part in the second embodiment.

FIG. 15 is an illustration showing a second exemplary control screen displayed on the display part 202 in the second embodiment of the present disclosure. The control screen includes icons implying the layout of the dining kitchen (DK) and the living room (L), and individual control information for individually controlling the respective devices 300 included in the dining kitchen and the living room.

In the individual control information, for example, an icon for a device 300 that is active is bright, and an icon for a device 300 that is inactive is dark. When an icon that is bright is touched, the integral controller 200 switches off the device 300 that corresponds to the icon by remote control through the communication network. When an icon that is dark is touched, the integral controller 200 switches on the device 300 that corresponds to the icon by remote control through the communication network. As a modification, an icon of switch-on and an icon of switch-off for the individual control may be displayed for each device 300 as shown in FIG. 14, though not shown in FIG. 15.

Figure 16:
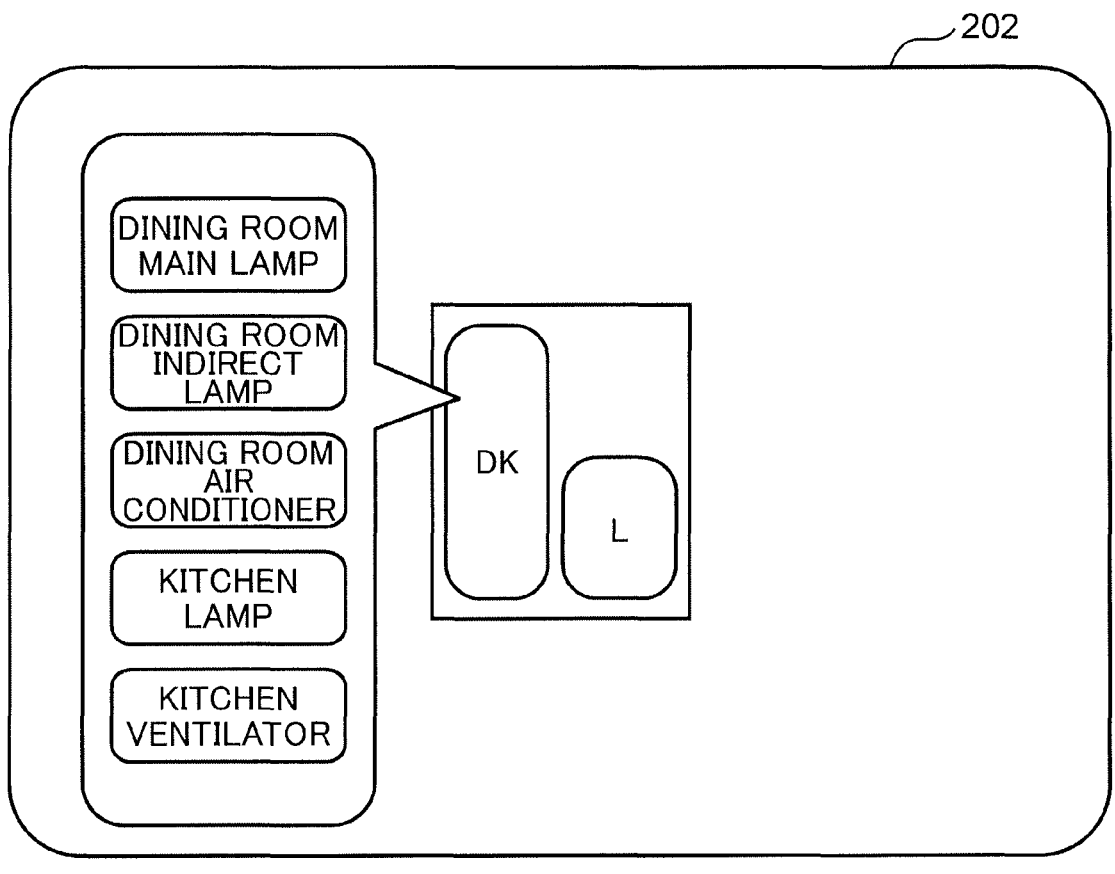
FIG. 16 is an illustration showing a third exemplary control screen displayed on the display part in the second embodiment.

FIG. 16 is an illustration showing a third exemplary control screen displayed on the display part 202 in the second embodiment of the present disclosure. The control screen includes icons implying the layout of the dining kitchen (DK) and the living room (L). For example, when an icon representing "DK" is touched, a pop-up window for the dining kitchen is displayed. The pop-up window for the dining kitchen includes individual control information for individually controlling the devices 300 included in the dining kitchen. When an icon representing "L" is touched, a pop-up window for the living room is displayed. The pop-up window for the living room includes individual control information for individually controlling the devices 300 included in the living room.

In the individual control information, for example, an icon for a device 300 that is active is bright, and an icon for a device 300 that is inactive is dark. When an icon that is bright is touched, the integral controller 200 switches off the device 300 that corresponds to the icon by remote control through the communication network. When an icon that is dark is touched, the integral controller 200 switches on the device 300 that corresponds to the icon by remote control through the communication network. As a modification, an icon of switch-on and an icon of switch-off for the individual control may be displayed for each device 300 as shown in FIG. 14, though not shown in FIG. 16.

In a home control system in the embodiment, a new space is created by combining two or more of the rooms on the basis of the disposition information 601 and the record information 602. Further, relevance information indicative of a relevance between identification information of the new space and identification information of two or more devices 300 included in the new space is generated; and, on the basis of the relevance information, individual control information for individually controlling the two or more devices is notified. An analysis of the record information 602 indicative of the performance record of each device 300 enables an accurate identification of an activity style of a resident of the house, resulting in an execution of an appropriate device control for the activity style.

Further, the home control system in the embodiment is effective for a smart home 100 that has a living room, a dining room, and a kitchen without wall partition, where how these rooms are combined varies due to the lifestyle of the resident. Accordingly, an installation of the system in the embodiment in such a house enables an appropriate creation of a new space for the lifestyle of the resident, increasing the advantage of the installation of the system.

In the home control system in the embodiment, the display part 202 displays the identification information (e.g., space name) of the new space, identification information (e.g., device name) of the two or more devices 300 included in the new space, and icons serving as the individual control information for individually controlling switch-on or switch-off of the two or more devices, providing a user interface easy for a user to understand and control.

Industrial Applicability

The present disclosure is useful especially when applied to a home control system for use in a smart home with IoT technology.

The invention claimed is:

1. A control system for controlling a plurality of devices disposed in a building, the building having a plurality of rooms, the control system comprising:
   a processor that:
   acquires disposition information and record information indicative of a performance record of each of the devices, the disposition information including a first relevance between first identification information of each of the rooms and second identification information of each of the devices disposed in each room;
   creates a new space by combining two or more of the rooms based on the disposition information and the record information;
   generates relevance information indicative of a second relevance between third identification information of the new space and fourth identification information of two or more devices included in the new space among the devices; and
   notifies, based on the relevance information, at least one of collective control information for collectively controlling the two or more devices and individual control information for individually controlling the two or more devices.

2. The control system according to claim 1, further comprising:
   a display,
   wherein the processor notifies of the collective control information, and
   the display displays the third identification information of the new space, fifth identification information of each of the two or more devices included in the new space, and an icon serving as the collective control information for collectively controlling the two or more devices.

3. The control system according to claim 1, wherein the processor notifies of the collective control information and the individual control information.

4. The control system according to claim 1, further comprising:
   a display,
   wherein the processor notifies of the individual control information, and
   the display displays the third identification information of the new space, fifth identification information of each of the two or more devices included in the new space, and icons serving as the individual control information for individually controlling the two or more devices.

5. The control system according to claim 1, wherein the processor
   calculates a number of active devices that is a number of devices which are active in each room in a same unit time of a plurality of divisional unit times of a day, and
   creates the new space by combining two or more rooms each of which has active devices not less than a threshold in number among the rooms.

6. The control system according to claim 5, wherein the processor calculates the number of active devices using a preset weighting factor for a device type.

7. The control system according to claim 5, wherein the processor changes the threshold in accordance with each unit time.

8. The control system according to claim 1, wherein the processor creates the new space by combining two or more rooms which have two or more devices having been active within a predetermined time among the devices.

9. The control system according to claim 1, wherein the processor generates the relevance information based on at least one of: years; seasons; months; weekdays; workdays-to-holidays; and time zones.

10. The control system according to claim 1, wherein the rooms include at least two of a living room, a dining room, and a kitchen.

11. The control system according to claim 1, wherein the record information indicates active periods of each of the two or more devices, and
   the processor generates the new space based on a correlation between the active periods.

12. A non-transitory computer-readable recording medium recording a program for causing a computer, included in a control system for controlling a plurality of devices disposed in a building having a plurality of rooms, to perform operations, the operations including:
   acquiring disposition information and record information indicative of a performance record of each of the devices, the disposition information including a first relevance between first identification information of each of the rooms and second identification information of each of the devices disposed in each room;
   creating a new space by combining two or more of the rooms based on the disposition information and the record information;
   generating relevance information indicative of a second relevance between third identification information of the new space and third identification information of two or more devices included in the new space among the devices; and
   outputting the relevance information to a notification part for notifying, based on the relevance information, at least one of collective control information for collectively controlling the two or more devices and individual control information for individually controlling the two or more devices.

13. A control method for controlling a plurality of devices disposed in a building, the building having a plurality of rooms, the control method comprising:
   by a computer,
   acquiring disposition information and record information indicative of a performance record of each of the devices, the disposition information including a first relevance between first identification information of each of the rooms and second identification information of each of the devices disposed in each room;

creating a new space by combining two or more of the rooms based on the acquired disposition information and the record information;

generating relevance information indicative of a second relevance between third identification information of the new space and third identification information of two or more devices included in the new space among the devices; and notifying by a notification part, based on the relevance information, at least one of collective control information for collectively controlling the two or more devices and individual control information for individually controlling the two or more devices.

\* \* \* \* \*